US011252335B2

(12) United States Patent
Takahashi (10) Patent No.: US 11,252,335 B2
(45) Date of Patent: Feb. 15, 2022

(54) IMAGE PROCESSING APPARATUS AND METHOD, AND NON-TRANSITORY COMPUTER-READABLE STORAGE MEDIUM

(71) Applicant: CANON KABUSHIKI KAISHA, Tokyo (JP)

(72) Inventor: Ryosuke Takahashi, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/708,164

(22) Filed: Dec. 9, 2019

(65) Prior Publication Data

US 2020/0120254 A1 Apr. 16, 2020

Related U.S. Application Data

(63) Continuation of application No. PCT/JP2018/021859, filed on Jun. 7, 2018.

(30) Foreign Application Priority Data

Jun. 28, 2017 (JP) .............................. JP2017-126515

(51) Int. Cl.
*H04N 5/235* (2006.01)
*H04N 5/243* (2006.01)
(Continued)

(52) U.S. Cl.
CPC ........... *H04N 5/2351* (2013.01); *H04N 5/243* (2013.01); *H04N 5/57* (2013.01); *H04N 7/025* (2013.01)

(58) Field of Classification Search
CPC ........ H04N 5/2351; H04N 5/243; H04N 5/57; H04N 7/025
See application file for complete search history.

(56) References Cited

U.S. PATENT DOCUMENTS

2017/0085833 A1* 3/2017 Toma ..................... H04N 5/243
2017/0374262 A1* 12/2017 Nagano .................. H04N 5/243

FOREIGN PATENT DOCUMENTS

CN 104603863 A 5/2015
CN 106097948 A 11/2016
(Continued)

OTHER PUBLICATIONS

International Search Report dated Jun. 28, 2017 of International Application No. PCT/JP2018/021859, without a translation.
(Continued)

*Primary Examiner* — Twyler L Haskins
*Assistant Examiner* — Fayez A Bhuiyan
(74) *Attorney, Agent, or Firm* — Cowan, Liebowitz & Latman, P.C.

(57) ABSTRACT

An image processing apparatus of the present invention for processing image data obtained by an image capturing apparatus comprises one or more processors and/or circuitry which functions as: an output unit that outputs the image data obtained by the image capturing apparatus and maximum luminance information which is information for indicating a maximum luminance of the image data to an external device; an acquisition unit that acquires a maximum luminance that the image capturing apparatus is capable of handling; and a control unit that controls the output unit to output the maximum luminance acquired by the acquisition unit as the maximum luminance information.

12 Claims, 9 Drawing Sheets

(51) Int. Cl.
*H04N 5/57* (2006.01)
*H04N 7/025* (2006.01)

(56) References Cited

FOREIGN PATENT DOCUMENTS

| | | |
|---|---|---|
| CN | 106101679 A | 11/2016 |
| CN | 106488157 A | 3/2017 |
| JP | 2015-169722 A | 9/2015 |
| JP | 2016-034125 A | 3/2016 |
| JP | 2016-058848 A | 4/2016 |
| JP | 2017-060113 A | 3/2017 |
| WO | 2016/072347 A | 5/2016 |

OTHER PUBLICATIONS

Nov. 23, 2020 Chinese Office Action, with an English Translation, that issued in Chinese Patent Application No. 201880043095.1.

\* cited by examiner

| picture001 | picture002 | picture003 | picture004 | picture005 |
|---|---|---|---|---|
| IMAGE DATA | IMAGE DATA | IMAGE DATA | IMAGE DATA | IMAGE DATA |
| DYNAMIC RANGE: 200% | DYNAMIC RANGE: 200% | DYNAMIC RANGE: 300% | DYNAMIC RANGE: 400% | DYNAMIC RANGE: 400% |
| SHOOTING DATE-TIME: 2016/1/1 | SHOOTING DATE-TIME: 2016/1/1 | SHOOTING DATE-TIME: 2016/1/1 | SHOOTING DATE-TIME: 2016/1/1 | SHOOTING DATE-TIME: 2016/1/1 |
| SHOOTING MODE: A | SHOOTING MODE: A | SHOOTING MODE: B | SHOOTING MODE: A | SHOOTING MODE: A |

| |
|---|
| GROUP1: picture001, picture002 |
| GROUP2: picture003 |
| GROUP3: picture004, picture005 |

IMAGE PROCESSING APPARATUS AND METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2018/021859, filed Jun. 7, 2018, which claims the benefit of Japanese Patent Application No. 2017-126515, filed Jun. 28, 2017, both of which are hereby incorporated by reference herein in their entirety.

BACKGROUND OF THE INVENTION

Field of the Invention

The present invention relates to an image processing apparatus and method, and non-transitory computer-readable storage medium.

Background Art

Heretofore, there are technologies for transmitting a video signal to a display device such as a television from a video signal source that holds video content. In recent years, technologies for transmitting characteristics of video content (e.g., information on the maximum luminance of content, etc.) that are included in video content to a display device as metadata, together with video information from the video signal source, when transmitting video content, have become prevalent.

By using such technologies, it becomes possible for the display device to perform image processing suitable for the performance of the display device and the characteristics of the video content. Also, it becomes possible for the side transmitting the video signal to transmit their intention as to how they want the video signal to be displayed on the display device, through the metadata that is appended.

As such technologies, there exist technologies for transmitting places of interest in video content, luminance information on objects and the like as metadata (refer to PTL1).

On the other hand, there are current digital cameras that connect to a television using a cable that conforms to standards such as High Definition Multimedia Interface (HDMI) (registered trademark), and have a function of displaying images recorded on recording media in the digital camera on the display of a television.

Here, in the case where luminance information is appended as described above, it is conceivable, when information on luminance differs from image to image, to transmit metadata that includes information on the highest luminance that differs from image to image to the television. In such cases, the metadata will differ from image to image, and the television may perform image processing that differs from image to image.

As an example of image processing that depends on the maximum luminance information attached as metadata, in the case where the maximum luminance information is less than or equal to the displayable luminance of the display device, display is performed at the luminance per the video signal. On the other hand, in the case where the maximum luminance information exceeds the displayable luminance of the display device, a uniform gain is applied to the input signal, and display is performed at a reduced luminance overall. With such image processing, in the case where a plurality of images of the same main subject are continuously displayed, for example, the following problem arises when images whose maximum luminance within the image is higher than and lower than the displayable luminance of the display device are displayed together, even if the luminance of the main subject is the same. That is, the luminance of the main subject that is displayed fluctuates up and down, adversely affecting the viewing experience.

The present invention has been made in view of the above problem, and an object thereof is to be able to, in the case of displaying a plurality of images, suppress any change in luminance when a subject having the same luminance throughout the plurality of images is represented on a display device.

CITATION LIST

Patent Literature

PTL1: Japanese Patent Laid-Open No. 2016-34125

SUMMARY OF THE INVENTION

In order to achieve the above object, an image processing apparatus of the present invention for processing image data obtained by an image capturing apparatus has one or more processors and/or circuitry which functions as: an output unit that outputs the image data obtained by the image capturing apparatus and maximum luminance information which is information for indicating a maximum luminance of the image data to an external device; an acquisition unit that acquire a maximum luminance that the image capturing apparatus is capable of handling; and a control unit that controls the output unit to output the maximum luminance acquired by the acquisition unit as the maximum luminance information.

Further, according to the present invention, provided is an image processing apparatus capable of processing a plurality of image data having a plurality of luminance ranges, comprising one or more processors and/or circuitry which functions as: an output unit that outputs image data to be output and maximum luminance information which is information for indicating a maximum luminance of the image data to an external device; a sorting unit that sorts a plurality of image data obtained by image capture; and a control unit that controls the output unit to output, as the maximum luminance information, the maximum luminance of a plurality of image data sorted into a predetermined group, rather than the maximum luminance of the image data to be output, in a case of outputting, with the output unit, one piece of image data sorted into the predetermined group.

Furthermore, according to the present invention, provided is an image processing method for processing image data obtained by an image capturing apparatus, comprising: outputting the image data obtained by the image capturing apparatus and maximum luminance information which is information for indicating a maximum luminance of the image data to an external device; acquiring a maximum luminance that the image capturing apparatus is capable of handling; and controlling to output the acquired maximum luminance as the maximum luminance information.

Further, according to the present invention, provided is an image processing method capable of processing a plurality of image data having a plurality of luminance ranges, comprising: outputting image data to be output and maximum luminance information which is information for indicating a maximum luminance of the image data to an external device; sorting a plurality of image data obtained by image capture; and controlling to output, as the maximum luminance information, the maximum luminance of a plurality of image data sorted into a predetermined group, rather than the maximum luminance of the image data to be output, in a case of outputting, in the output step, one piece of image data sorted into the predetermined group.

Further, according to the present invention, provided is a non-transitory computer-readable storage medium storing a program for causing a computer to function as units of the image processing apparatus for processing image data obtained by an image capturing apparatus, comprising: an output unit that outputs the image data obtained by the image capturing apparatus and maximum luminance information which is information for indicating a maximum luminance of the image data to an external device; an acquisition unit that acquire a maximum luminance that the image capturing apparatus is capable of handling; and a control unit that controls the output unit to output the maximum luminance acquired by the acquisition unit as the maximum luminance information.

Further, according to the present invention, provided is a non-transitory computer-readable storage medium storing a program for causing a computer to function as units of the image processing apparatus capable of processing a plurality of image data having a plurality of luminance ranges, comprising: an output unit that outputs image data to be output and maximum luminance information which is information for indicating a maximum luminance of the image data to an external device; a sorting unit that sorts a plurality of image data obtained by image capture; and a control unit that controls the output unit to output, as the maximum luminance information, the maximum luminance of a plurality of image data sorted into a predetermined group, rather than the maximum luminance of the image data to be output, in a case of outputting, with the output unit, one piece of image data sorted into the predetermined group.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, modes for carrying out the present invention will be described in detail with reference to the accompanying drawings. Note that, in the present embodiment, description is given using a digital camera as an example of an information processing apparatus, but the present invention is not limited to a digital camera, and is applicable to devices for processing information such as mobile phones, personal computers (laptops, desktops, tablets, etc.), and game machines.

Figure 1:
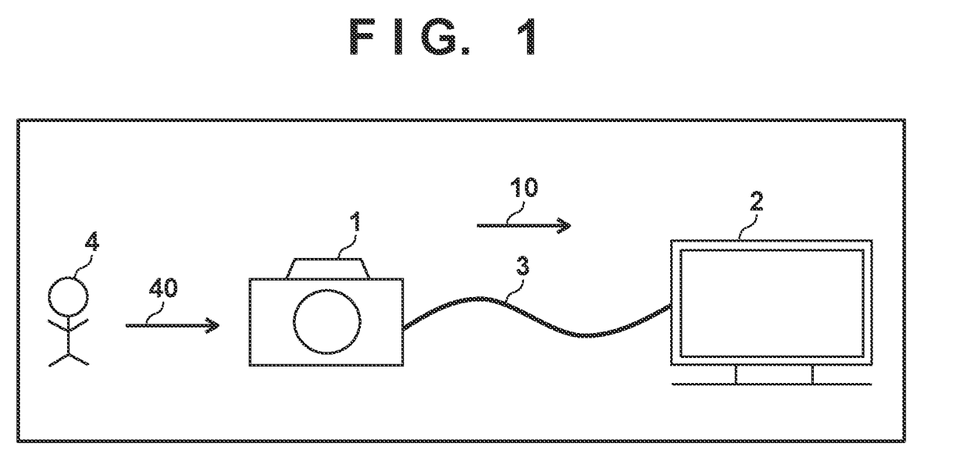
FIG. 1 is a conceptual diagram showing a system in embodiments of the present invention.

FIG. 1 is a conceptual diagram showing a system in which a digital camera of the present embodiment is used. A digital camera 1 is connected to a display 2 with a cable 3 (or wirelessly).

In the digital camera 1, shot images are stored as image files. Here, image files of the present embodiment refer to RAW files consisting of information obtained by recording optical signals acquired by a sensor of the digital camera and shooting time information, and JPEG files consisting of image information converted into JPEG and shooting time information.

In the system shown in FIG. 1, the digital camera 1 receives an instruction 40 (hereinafter, reproduction instruction) for reproducing and displaying image files stored in the digital camera 1 on the display 2 from a user 4. The digital camera 1, upon receiving the reproduction instruction 40, performs display of images stored in the digital camera 1 using the display 2, by transmitting a transmission signal 10 consisting of image information and metadata generated from information of the image files to the display 2.

First Embodiment

Figure 2:
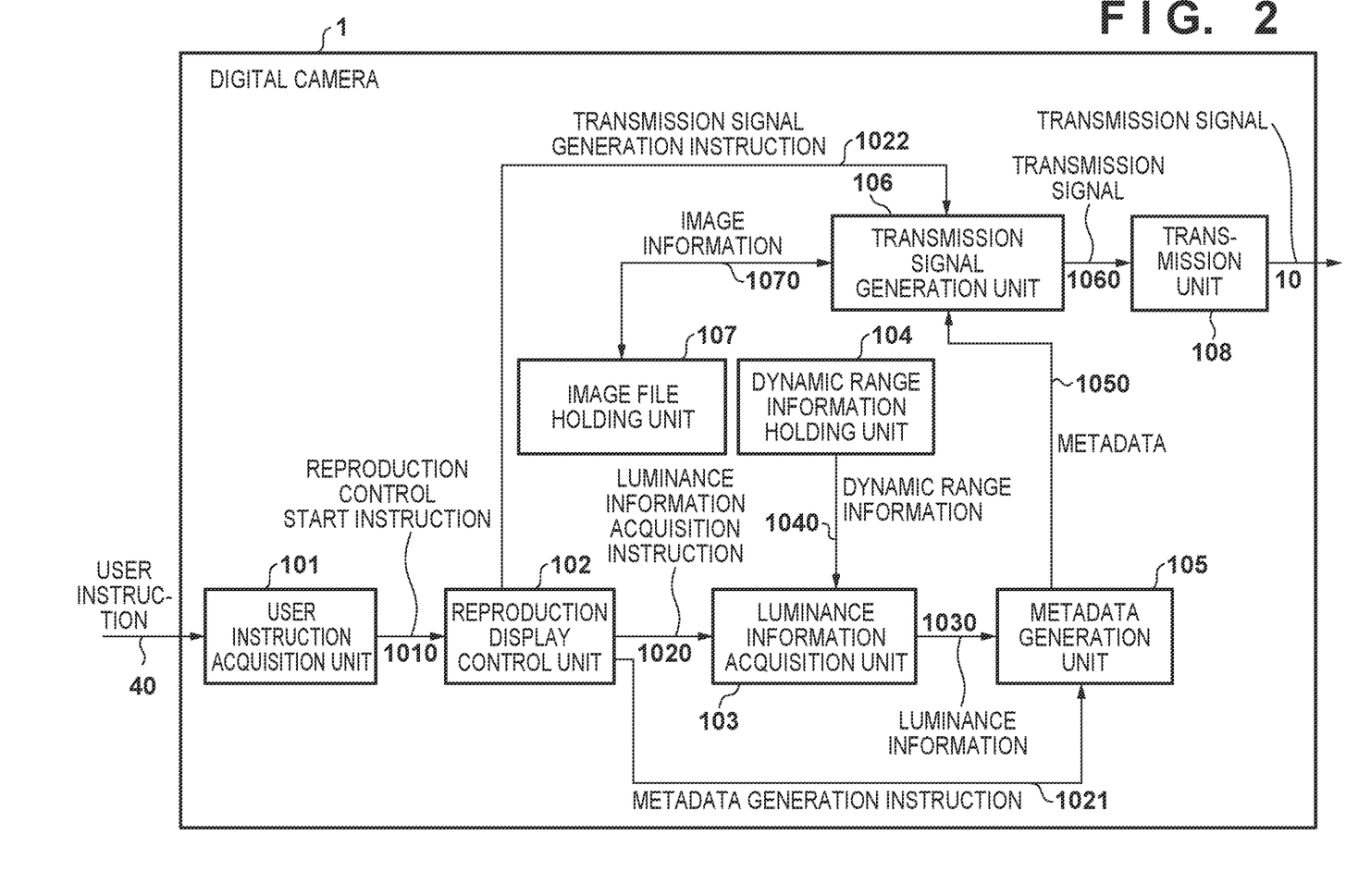
FIG. 2 is a block diagram showing a configuration of processing modules of a digital camera in a first embodiment.

FIG. 2 is a block diagram representing the configuration of processing modules in the digital camera 1 of the first embodiment, and, for example, some or all the processing is constituted using a CPU, a memory and the like (not shown) that are included in the digital camera 1. In the first embodiment, a user instruction acquisition unit 101, a reproduction display control unit 102, a luminance information acquisition unit 103, a dynamic range information holding unit 104, a metadata generation unit 105, a transmission signal generation unit 106, an image file holding unit 107 and a transmission unit 108 are included as processing modules. Note that, in FIG. 2, processing modules that are unnecessary in describing the present embodiment are omitted.

The user instruction acquisition unit 101 consists of a user interface such as buttons, a touch panel and the like arranged on the digital camera 1, for example, for receiving instructions from the user and a processing unit thereof, and receives the reproduction instruction 40 from the user 4. The reproduction instruction 40 includes an instruction as to which image file to display among the plurality of image files and how the image file is to be displayed. The user instruction acquisition unit 101, upon receiving the reproduction instruction 40 from the user, transmits a reproduction control start instruction 1010 to the reproduction display control unit 102.

The reproduction display control unit 102, upon receiving the reproduction control start instruction 1010, transmits a luminance information acquisition instruction 1020 to the luminance information acquisition unit 103, and transmits a metadata generation instruction 1021 to the metadata generation unit 105. Also, a transmission signal generation instruction 1022 is transmitted to the transmission signal generation unit 106. Here, information that is transmitted from the reproduction display control unit 102 to the processing modules includes information on the image to be displayed and how the image is to be displayed.

The luminance information acquisition unit 103, upon receiving the luminance information acquisition instruction 1020, acquires dynamic range information 1040 showing the luminance range that is handled by the digital camera 1 from the dynamic range information holding unit 104 as luminance information. The dynamic range of the digital camera 1 generally changes due to factors such as shooting settings, and the dynamic range information 1040 in the first embodiment is the maximum dynamic range capable of being handled by that model of digital camera 1. As an example, here, description will be given assuming that information showing 1000% is held in the dynamic range information holding unit 104, as the maximum dynamic range capable of being handled by the digital camera 1. Note that the maximum value of the dynamic ranges set at the shooting times of a plurality of images to be displayed may also be used.

Next, the luminance information acquisition unit 103 converts the acquired dynamic range information 1040 into luminance information 1030. In the first embodiment, the value of the dynamic range described in the dynamic range information 1040 is replaced by luminance, which is taken as luminance information. For example, 1000% is replaced by 1000 nits.

The metadata generation unit 105 receives the metadata generation instruction 1021 and the luminance information 1030, and generates metadata. Here, in the first embodiment, description is given showing data that includes information on maximum luminance as metadata, but the type of metadata is not limited thereto. For example, information on color gamut, color temperature, minimum luminance and the like may be appended as metadata. Also, for example, information on MaxCLL (Maximum Content Light Level) or MaxFALL (Maximum Frame Average Light Level) supported by HDMI may be appended.

The metadata generation unit 105 converts the acquired luminance information 1030 into a format of metadata (format defined as a metadata format), and outputs the converted luminance information as metadata 1050.

The transmission signal generation unit 106 receives the transmission signal generation instruction 1022 and the metadata 1050, and generates a signal for transmitting to the display 2 connected to the digital camera 1. Specifically, the transmission signal generation unit 106, upon receiving the transmission signal generation instruction 1022, acquires image information 1070 required in creation of the signal to be transmitted from the image file holding unit 107. The image file holding unit 107 holds image data having various dynamic ranges shot with the digital camera 1 as image files. The transmission signal generation unit 106 then converts the acquired image information 1070 into a format suitable for signal transmission.

In the present embodiment, image information is converted into a format that conforms to EOTF (Electro Optical Transfer Function) defined in SMPTE ST 2084 as a format suitable for transmission. Here, the signal defined in SMPTE ST 2084 is a signal representing absolute luminance. However, generally, information of an image file shot with a digital camera is often held at a relative brightness, rather than being held in a data format representing absolute luminance. In view of this, in the present embodiment, allocation of a specific relative value (e.g., 18%) within each image file to a specific absolute luminance (e.g., 18 nits), is decided, and the format is converted so as to achieve that allocation whatever the dynamic range of the image file.

Assume, for example, that there is an image file A whose bit width of the image file is 10 bits and whose maximum dynamic range is 100%, and the dynamic range corresponding to given pixel values is as follows.

Image file A (maximum dynamic range: 100%)
  Pixel value 0: dynamic range 0%
  Pixel value 184: dynamic range 18%
  Pixel value 1023: dynamic range 100%

In this case, conversion into a signal that represents a pixel value 0 as 0 nits, a pixel value 184 as 18 nits, and a pixel value 1023 (maximum value) as 100 nits is performed.

Here, there are digital cameras 1 capable of changing the dynamic range of an image file to be recorded, by changing the settings. In such cases, the values of the dynamic range corresponding to the pixel values of an image file may differ from image file to image file.

Also, assume that there is an image file B whose bit width of the image file is 10 bits and whose maximum dynamic range is 1000%, and the dynamic range corresponding to given pixel values is as follows.

Image file B (maximum dynamic range: 1000%)
  Pixel value 0: dynamic range 0%
  Pixel value 18: dynamic range 18%
  Pixel value 1023: dynamic range 1000%

In this case, conversion into a signal that represents a pixel value 0 as 0 nits, a pixel value 18 as 18 nits, and a pixel value 1023 (maximum value) as 1000 nits is performed.

In this way, in a digital camera capable of generating image files having different dynamic ranges, generally, information relating to dynamic ranges that correspond to the pixel values of image files is held in the digital camera, for every image file format, thus enabling conversion such as described above to be performed.

By performing such conversion (hereinafter called "luminance conversion"), given relative values will be converted into signals representing the same luminance, irrespective of whether the image file has a dynamic range of 100% or whether the image file has a dynamic range of 1000%, for example.

In the transmission signal generation unit 106, the received metadata 1050 and the image information converted into a format suitable for transmission are associated with each other, and transmitted to the transmission unit 108 as a transmission signal 1060. The transmission unit 108 is constituted by a terminal that conforms to standards such as HDMI and a control unit thereof, and transmits the transmission signal 1060 sent from the transmission signal generation unit 106 to outside the digital camera 1.

According to the first embodiment as described above, metadata including information on a common maximum luminance is appended to image information obtained by converting pixel values relatively represented in the respective images into luminance values in a common dynamic range. With the display 2, it becomes possible to handle a range of image data that the user wants to display at the same luminance as the same luminance signal, by converting and displaying luminance values of the image information such that the common maximum luminance included in the metadata achieves a luminance displayable by the display 2.

Second Embodiment

Next, a second embodiment of the present invention will be described. In the second embodiment, another external digital camera is connectable to the digital camera 1, and processing in the case of being able to receive and hold image files from a connected external digital camera will be described. Note that a mode in which image files are acquired via a portable recording medium may be adopted as a mode of acquiring image files from another digital camera 1. Hereinafter, an example will be described in which metadata is determined based on information on the digital camera that generated the image file.

Figure 3:
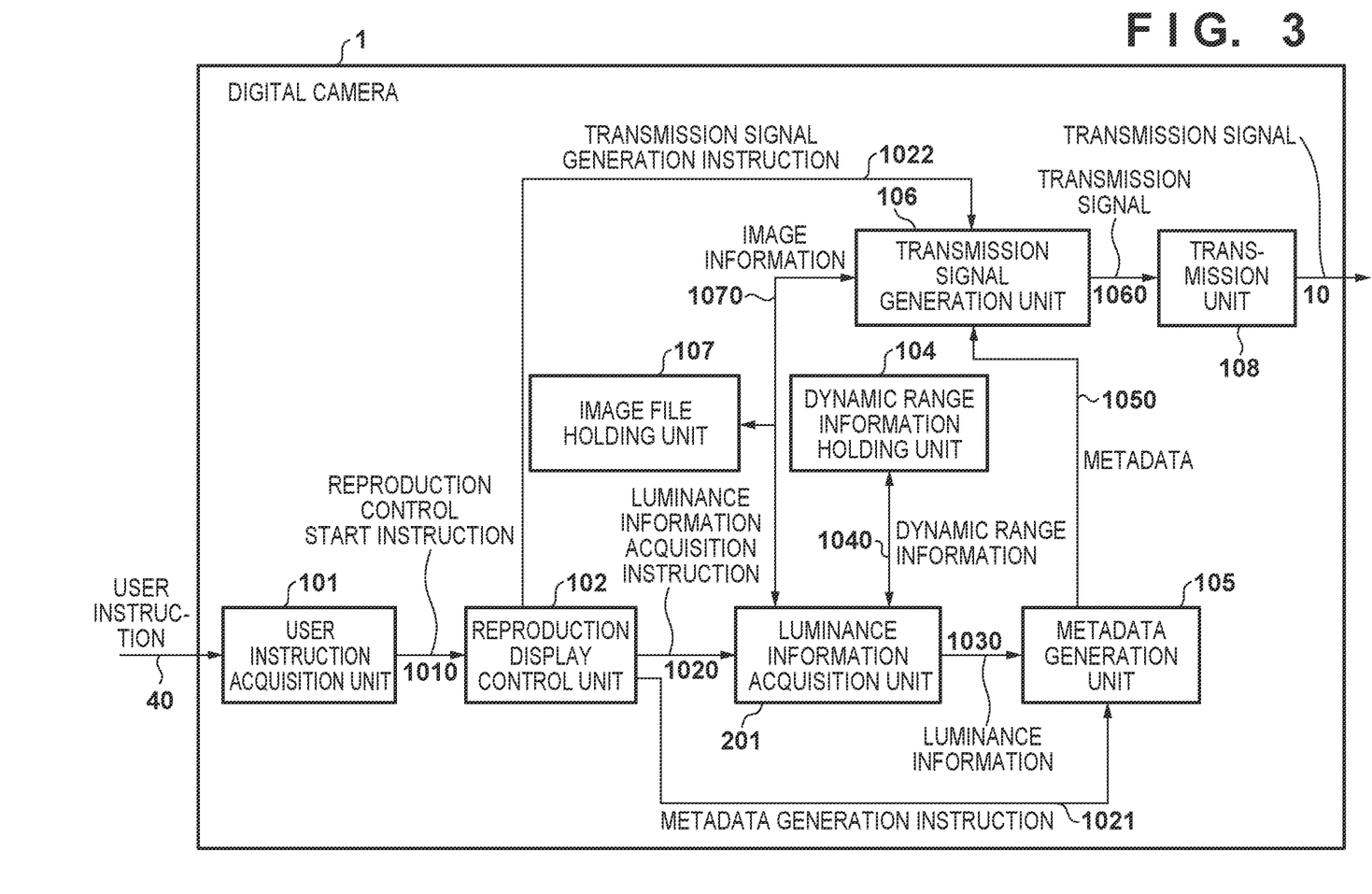
FIG. 3 is a block diagram showing a configuration of processing modules of a digital camera in second and fourth embodiments.

FIG. 3 is a block diagram representing the configuration of processing modules in a digital camera 1 of the second embodiment, and, for example, some or all the processing is constituted using a CPU, a memory and the like (not shown) that are included in the digital camera 1. The processing of the digital camera 1 in the second embodiment differs in the processing of a luminance information acquisition unit 201, in comparison with the processing described with reference to FIG. 2. The second embodiment is otherwise similar to the first embodiment, and thus the same reference numbers will be given and description will be omitted as appropriate.

The luminance information acquisition unit 201, upon receiving the luminance information acquisition instruction 1020, acquires the image information 1070 of the image to be displayed from the image file holding unit 107.

Figure 4:
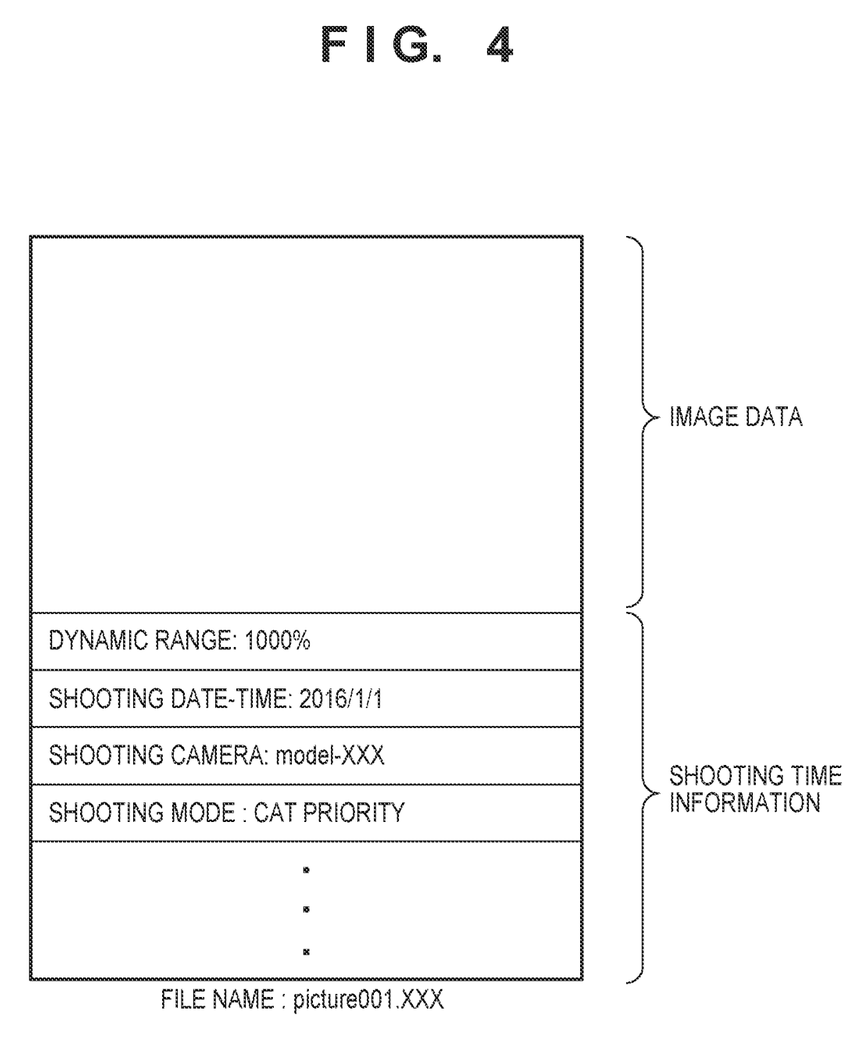
FIG. 4 is a diagram showing information that is included in image information in the second embodiment.

FIG. 4 is a diagram showing an example of information that is included in given image information. The image information is constituted by an image data part, which is the data of the image, and a shooting time information part consisting of shooting time information. Here, shooting time information is information on the dynamic range determined from the settings of the camera, shooting date-time, identification information of the camera used in shooting, and shooting mode (e.g., operation modes of the camera such as night view mode suitable for shooting night views), for example.

The luminance information acquisition unit 201 acquires identification information of the camera used in shooting from the image information 1070, and acquires dynamic range information 1040 that depends on the identification information from the dynamic range information holding unit 104. In the second embodiment, the dynamic range information holding unit 104 holds dynamic range information for each camera identification information. Note that, in the case where there is no dynamic range information corresponding to the identification information of the camera, the dynamic range information holding unit 104 provides the dynamic range information of another camera instead.

The luminance information acquisition unit 201 then converts the acquired dynamic range information 1040 into luminance information 1030 with a similar method to the first embodiment, and outputs the luminance information 1030 to the metadata generation unit 105. In the metadata generation unit 105, the acquired luminance information 1030 is converted into metadata format, and output as metadata 1050.

In the transmission signal generation unit 106, the received metadata 1050 and the image information converted into a format suitable for transmission are associated with each other, and transmitted to the transmission unit 108 as the transmission signal 1060, similarly to the first embodiment.

According to the second embodiment as described above, metadata that includes information on a common maximum luminance is appended to image information obtained by converting images shot with the same camera into luminance values in a common dynamic range. In the display 2, it thereby becomes possible to handle a range of image data that the user wants to display at the same luminance as the same luminance signal, with respect to images shot with the same digital camera.

Third Embodiment

Next, a third embodiment of the present invention will be described. In the first embodiment, an example in which metadata including information on a common maximum luminance is appended to all images in the digital camera 1 was described. In contrast, in the third embodiment, an example in which images are grouped and, for every group, the same metadata is appended to images included in the group will be described.

Figure 5:
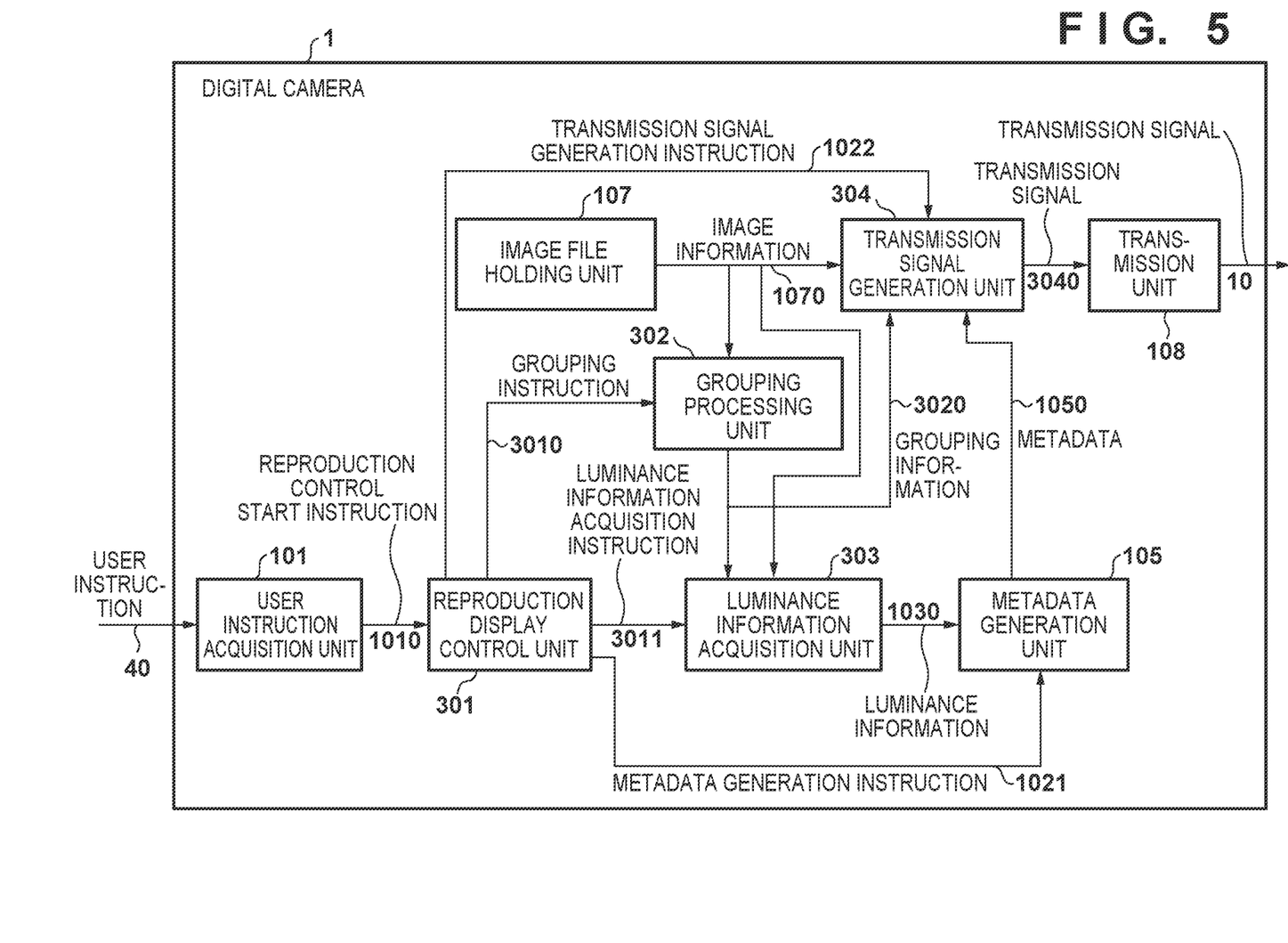
FIG. 5 is a block diagram showing a configuration of processing modules of a digital camera in a third embodiment.

FIG. 5 is a block diagram representing the configuration of processing modules in a digital camera 1 of the third embodiment, and, for example, some or all the processing is constituted using a CPU, a memory and the like (not shown) that are included in the digital camera 1. The processing modules of the digital camera 1 in the third embodiment include a grouping processing unit 302, in comparison with the processing modules described with reference to FIG. 2, and, as a result, the processing of a reproduction display control unit 301, a luminance information acquisition unit 303 and a transmission signal generation unit 304 differs. The third embodiment is otherwise similar to the first embodiment, and thus the same reference numbers will be given and description will be omitted as appropriate.

The reproduction display control unit 301, upon receiving the reproduction control start instruction 1010, transmits a grouping instruction 3010 to the grouping processing unit 302, transmits a luminance information acquisition instruction 3011 to the luminance information acquisition unit 303, and transmits the metadata generation instruction 1021 to the metadata generation unit 105. Also, the transmission signal generation instruction 1022 is transmitted to the transmission signal generation unit 304. Here, the information that is transmitted from the reproduction display control unit 301 to the processing modules includes information on the image to be displayed and how the image is to be displayed.

The grouping processing unit 302 receives the grouping instruction 3010, and performs grouping of image files. The grouping referred to here involves sorting image files to which the same metadata is to be appended into groups, in accordance with a grouping condition determined in advance.

The grouping condition is, for example, that one or more of information such as the shooting date-time of an image, shooting mode, setting of post-production image processing, shutter speed and the like are the same or similar. The grouping condition may be preset in the digital camera 1, or may be selectable by the user. Also, at the time of grouping, grouping may be performed with consideration for the order in which display will be performed.

Figure 6A:
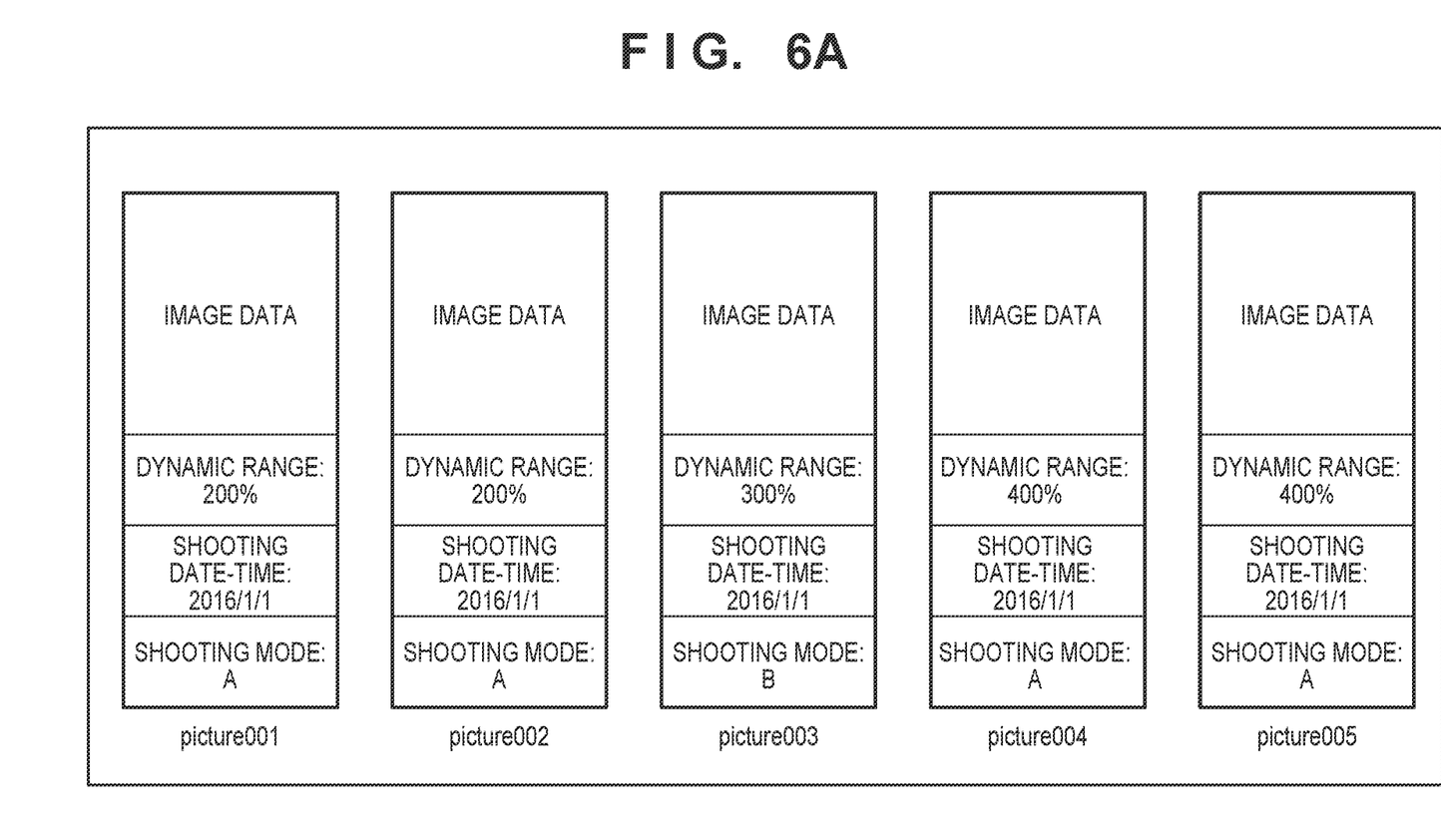
FIG. 6A is a diagram for describing an example of grouping processing in the third embodiment.

Here, an example of grouping processing will be described using FIGS. 6A to 6C. FIG. 6A shows an example of image files that are held by the image file holding unit 107. Note that it is assumed that display will be performed in ascending order from the image of image file picture001, and the grouping condition is that shooting date-time and shooting mode are both the same.

Figure 6B:
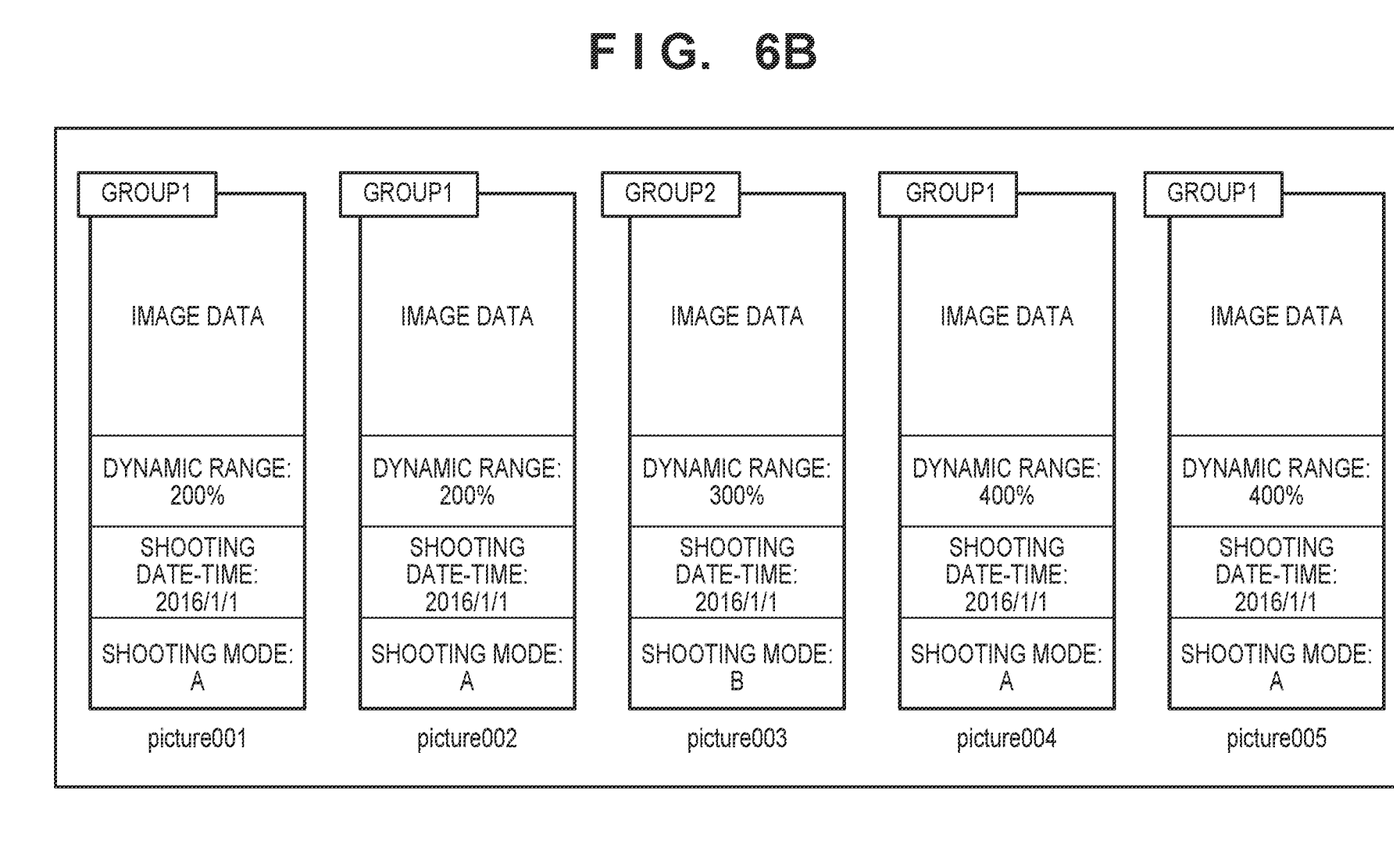
FIG. 6B is a diagram for describing an example of grouping processing in the third embodiment.

FIG. 6B is an example of grouping based only on the grouping condition. In FIG. 6B, the image files picture001, picture002, picture004 and picture005 are in group 1 and only the image file picture003 is in group 2.

Figure 6C:
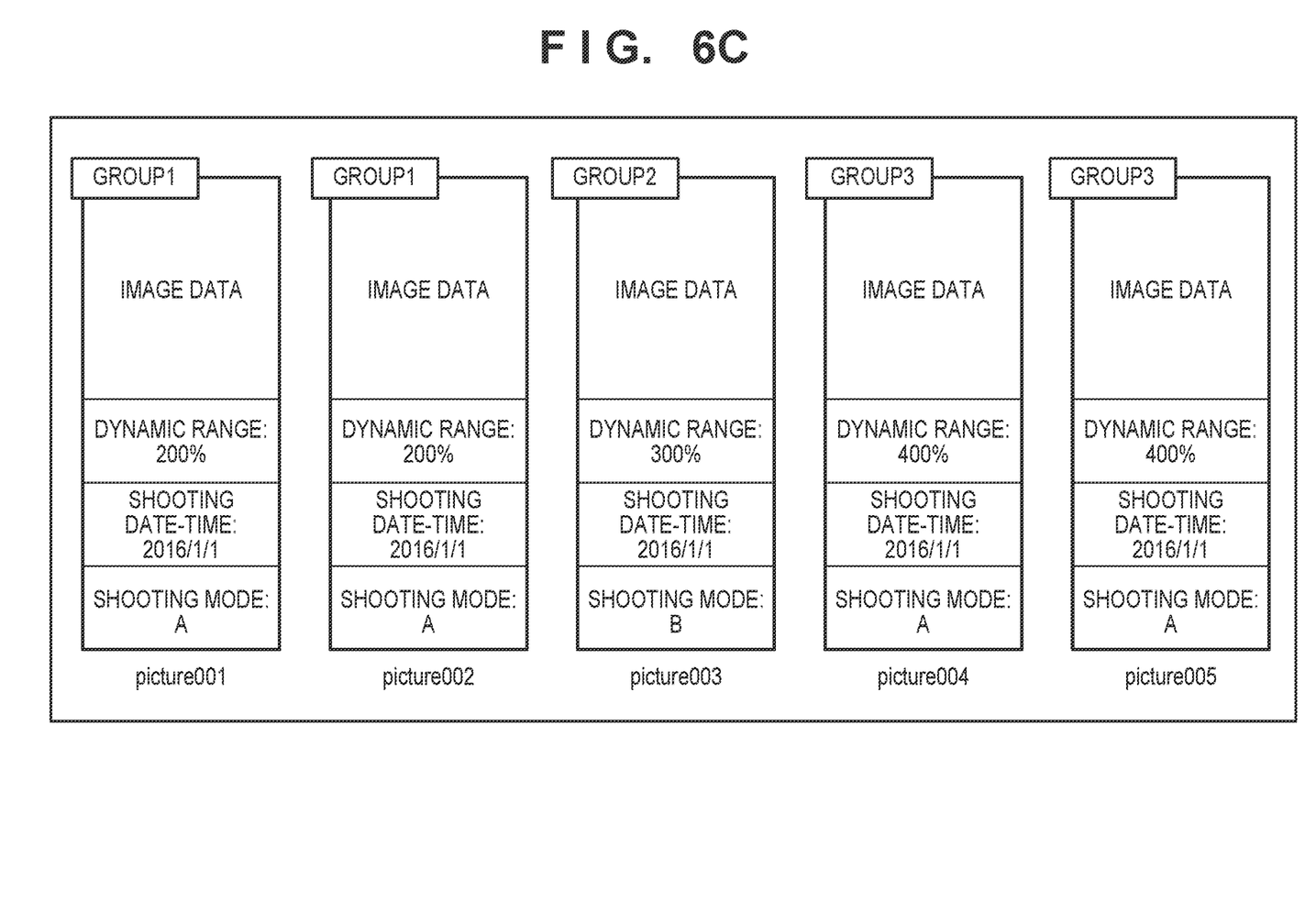
FIG. 6C is a diagram for describing an example of grouping processing in the third embodiment.

FIG. 6C shows an example of grouping with consideration for the order in which display will be performed (display order). Image files whose grouping condition is the same are grouped in ascending order from the image file picture001 that will be displayed first. The image files from picture001 to picture002 meet the grouping condition, and thus form the same group (group 1). Although the image files from picture003 are grouped as a separate group, the next image file picture004 does not meet the grouping condition with the image file picture003. Therefore, the image file picture003 forms a group (group 2) consisting of a single image file. Similarly, the remaining image files picture004 and picture005 meet the grouping condition, and thus form the same group (group 3).

Here, grouping with consideration for the order of display is to reduce any adverse effects due to different metadata being appended if images included in a given group are not displayed continuously, since adverse effects due to changes in image processing tend to be less perceptible to the human eye. Also, fewer number of image files included in the groups enables a more suitable maximum luminance to be set for the images, thus increasing the possibility of being able to perform display in a dynamic range suitable for the images.

Figure 7:
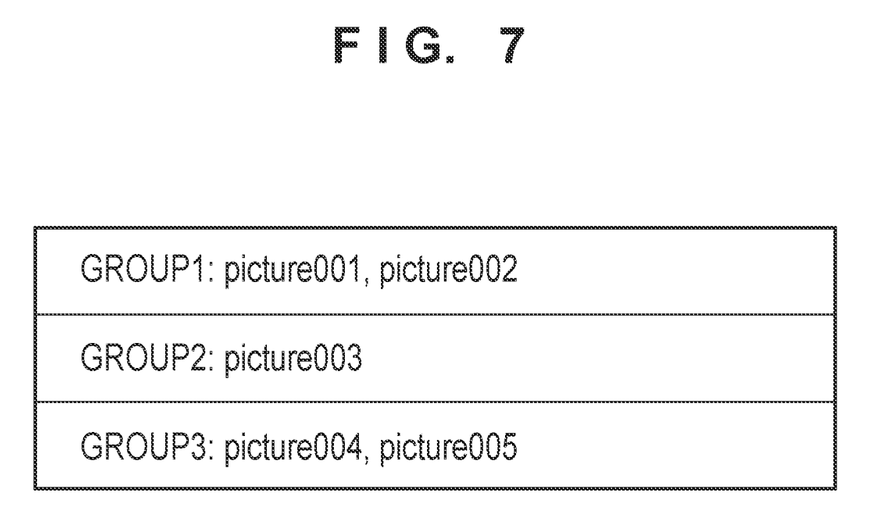
FIG. 7 is a diagram showing an example of grouping information in the third embodiment.

The grouping processing unit 302 outputs information obtained by grouping the image files with a method such as described above to the luminance information acquisition unit 303 and the transmission signal generation unit 304 as the grouping information 3020. FIG. 7 is a diagram showing an example of the grouping information 3020.

The luminance information acquisition unit 303, upon acquiring the luminance information acquisition instruction 3011 and the grouping information 3020, acquires luminance information for every group described in the grouping information 3020. Here, the largest dynamic range among the dynamic ranges of the image files belonging to each group is acquired, and the acquired dynamic range is replaced by luminance, which is taken as the maximum luminance information of that group. For example, if the maximum dynamic range in the group is 1000%, the maximum luminance information of that group will be 1000 nits.

In the example shown in FIG. 6C, the maximum luminance information of group 1 will be 200 nits, the maximum luminance information of group 2 will be 300 nits, and the maximum luminance information of group 3 will be 400 nits.

Note that, in the third embodiment, an example in which the maximum luminance information of each group is acquired from the largest dynamic range among the dynamic ranges of the image files belonging to the group is shown, but the method of acquiring luminance information is not limited thereto. A table containing luminance information corresponding to each information (e.g., shooting mode) included in the shooting time information of the images may be held, and the maximum luminance information may be acquired from the shooting time information of the image files of each group using the table.

The transmission signal generation unit 304 receives the transmission signal generation instruction 1022 and the metadata 1050, and generates a signal for transmitting to the display 2 connected to the digital camera 1. Specifically, the transmission signal generation unit 304, upon receiving the transmission signal generation instruction 1022, acquires image information 1070 required in creation of the signal to be transmitted from the image file holding unit 107, and acquires the grouping information 3020 from the grouping processing unit 302. The transmission signal generation unit 106 then performs luminance conversion of the acquired image information 1070 by the method described in the first embodiment, and, furthermore, converts the image information to a format suitable for signal transmission. In the third embodiment, the image information is converted into a format that conforms to EOTF defined in SMPTE ST 2084 as a format suitable for transmission. In the transmission signal generation unit 304, the received metadata 1050 and the image information converted into a format suitable for transmission are associated with each other, and transmitted to the transmission unit 108 as a transmission signal 3040.

In this way, images are grouped, and, for every group, metadata that includes information on a common maximum luminance is appended to image information converted into a luminance value in a common dynamic range. In the display 2, it thereby becomes possible to handle a range of image data that the user wants to display at the same luminance as the same luminance signal for every group.

Fourth Embodiment

Next, a fourth embodiment of the present invention will be described. In the abovementioned first to third embodiments, the case where one piece of metadata is generated for each image was described. In contrast, in the fourth embodiment, an example in which common metadata that is common to all the images and individual metadata for each image are generated for each image and final metadata is generated from these two pieces of metadata depending on a slideshow reproduction interval will be described.

Note that although the configuration of the processing modules of the digital camera 1 in the fourth embodiment is similar to that shown in FIG. 3, the detailed contents of the processing differ, and thus the processing modules will be described below with reference to FIG. 3.

The user instruction acquisition unit 101 consists of a user interface such as buttons, a touch panel and the like arranged on the digital camera 1, for example, and a processing unit thereof, and receives a user instruction 41 from a user. In the fourth embodiment, the user instruction 41 includes a slideshow display instruction. Note that the slideshow display instruction is an instruction to perform slideshow display in which image files held in the digital camera 1 are switched at a time interval designated by the user and sequentially displayed on the display 2 connected to the digital camera 1. This slideshow display instruction includes designation of the image from which to start display and designation of the time interval (hereinafter, transition time) at which display is to be switched.

The user instruction acquisition unit 101, upon receiving the slideshow display instruction from the user, transmits the reproduction control start instruction 1010 to the reproduction display control unit 102.

The reproduction display control unit 102, upon receiving the reproduction control start instruction 1010, transmits the luminance information acquisition instruction 1020 to the luminance information acquisition unit 201, and transmits the metadata generation instruction 1021 to the metadata generation unit 105. Also, the transmission signal generation instruction 1022 is transmitted to the transmission signal generation unit 106. Here, the information that is transmitted to the processing modules includes information such as the image from which to start display, the transition time of display and the like designated by the slideshow display instruction.

The luminance information acquisition unit 201 receives the luminance information acquisition instruction 1020, and acquires the maximum luminance information. The maximum luminance information in the fourth embodiment is constituted by common luminance information that is common to all images held at the image file holding unit 107 and individual luminance information for every image. Note that, in the fourth embodiment, common luminance information that is common to all the images held in the image file holding unit 107 is acquired, but the present invention is not limited thereto. For example, in the case where there are image files shot with other digital cameras as described in the second embodiment, common luminance information may be acquired for every digital camera. Also, in the case where a plurality of images are designated for display by the slideshow display instruction, common luminance information that is common to the plurality of designated images may be acquired.

The luminance information in the fourth embodiment can be generated from information on the dynamic range. In view of this, the luminance information acquisition unit 201, upon receiving the luminance information acquisition instruction 1020, first acquires the dynamic range information 1040 from the dynamic range information holding unit 104 as common dynamic range information. Note that the common dynamic range is, similarly to the first embodiment, a luminance range that the digital camera 1 is capable of handling. As an example, here, assume that the information 1000% is held in the dynamic range information holding unit 104 as the maximum dynamic range capable of being handled by the digital camera 1.

Next, the luminance information acquisition unit 201 acquires the image information 1070 from the image file holding unit 107, in order to acquire dynamic range information for every image. Image information is constituted by an image data part, which is the data of the image, and a shooting time information part consisting of shooting time information, as described above with reference to FIG. 4. The luminance information acquisition unit 201 sets the dynamic range information included in the shooting time information part of the acquired image information 1070 as the dynamic range information of every image.

The luminance information acquisition unit 201 converts the acquired common dynamic range information and dynamic range information for every image respectively into common luminance information and individual luminance information. In the fourth embodiment, similarly to the first embodiment, the value of the dynamic range described in respective dynamic range information is replaced by luminance, which is taken as luminance information. For example, 1000% is replaced by 1000 nits. The created common luminance information and individual luminance information are then combined as luminance information 1030.

The metadata generation unit 105 receives the metadata generation instruction 1021 and the luminance information 1030, and generates metadata. Here, in the fourth embodiment, description is given showing data that includes information on maximum luminance as metadata, but the type of metadata is not limited thereto. For example, information on color gamut, color temperature, minimum luminance and the like may be appended as metadata. Also, for example, information on MaxCLL or MaxFALL supported by HDMI may be appended.

The metadata generation unit 105 converts the acquired luminance information 1030 into metadata format (format defined as metadata format), and outputs the converted luminance information as metadata 1050. In the fourth embodiment, the metadata 1050 includes common metadata and individual metadata.

The transmission signal generation unit 106 receives the transmission signal generation instruction 1022 and the metadata 1050, and generates a signal for transmitting to the display 2 connected to the digital camera 1. Specifically, the transmission signal generation unit 106, upon receiving the transmission signal generation instruction 1022, acquires image information 1070 required in creation of the signal to be transmitted from the image file holding unit 107. The transmission signal generation unit 106 then performs luminance conversion of the acquired image information 1070 by the method described in the first embodiment, and, furthermore, converts the image information to a format suitable for signal transmission. In the fourth embodiment, the image information is converted into a format that conforms to EOTF defined in SMPTE ST 2084 as a format suitable for transmission.

Next, the method of determining the maximum luminance in the fourth embodiment will be described. The transmission signal generation unit 106 combines the common metadata and the individual metadata to generate metadata for transmission on the basis of the transition time of display of the slideshow that is included in the transmission signal generation instruction 1022. Here, the combining ratio is such that the ratio of common metadata is higher as the transition time is shorter, and conversely the ratio of individual metadata is higher as the transition time is longer. This is to reduce the difference in metadata between images, since changes in image processing on the television side due to changes in metadata occur more frequently as the time interval is shorter. Also, there is a strong tendency, when using individual metadata, for image processing on the television side to be more desirable for viewing images individually, and thus emphasis is placed on the metadata for every image in the case where the time interval is long (change in image processing does not occur often).

In view of this, in the transmission signal generation unit 106, a table for determining the combining ratio of common metadata and individual metadata, according to transition time, is held in advance. Common metadata and individual metadata are then combined according to information in this table, and metadata for transmission is generated. In the transmission signal generation unit 106, the combined metadata and the image information converted into a format suitable for transmission are then associated with each other, and transmitted to the transmission unit 108 as the transmission signal 1060.

In this way, it becomes possible to enable more readily viewable display to be performed, by adjusting the maximum luminance according to the slideshow transition time.

Note that whether to perform the processing shown in the abovementioned first to fourth embodiments can be set by a user operation, for example. In other words, a configuration may be adopted in which a mode for transmitting, for every image, a maximum luminance that is based on the dynamic range of the image to an external device, and a mode for transmitting the maximum luminance to an external device as in first to fourth embodiment are provided.

In the case of displaying a plurality of images, any change in luminance when a subject having the same luminance throughout the plurality of images is represented on a display device can be suppressed.

Other Embodiments

In the abovementioned first to fourth embodiments, an example in which the digital camera 1 generates image files that are output to the display 2 was described, but the present invention is not limited thereto. For example, the processing modules shown in FIG. 2, 3 or 5 may be constituted in an external image processing apparatus, and image files may be acquired from an image capturing apparatus. In that case, an image capturing system can be constituted by the image capturing apparatus and the image processing apparatus.

Also, the present invention may be implemented by combining the abovementioned first to fourth embodiments as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus for processing image data obtained by an image capturing apparatus, comprising one or more processors and/or circuitry which functions as:
    an output unit that outputs image data and maximum luminance information which is information for indicating a maximum luminance of the image data to an external device;
    an acquisition unit that acquires a maximum luminance that the image capturing apparatus is capable of handling;
    a conversion unit that converts pixel values of the image data that is obtained by the image capturing apparatus and is based on a luminance range used in order to obtain the image data into luminance values that are based on a specific dynamic range among dynamic ranges that the image capturing apparatus is capable of setting; and
    a control unit that controls the output unit to output the image data whose pixel values are converted into the luminance values by the conversion unit and the maximum luminance acquired by the acquisition unit as the maximum luminance information.

2. The image processing apparatus according to claim 1, wherein:
    the image capturing apparatus is capable of setting a plurality of luminance ranges, and
    the acquisition unit acquires the maximum luminance, among luminance included in the plurality of settable luminance ranges.

3. The image processing apparatus according to claim 1, wherein:
    the image processing apparatus is capable of processing a plurality of image data obtained by a plurality of image capturing apparatuses, and
    the acquisition unit acquires the maximum luminance that each of the plurality of image capturing apparatuses is capable of handling, based on information of the image capturing apparatus that acquired each of the plurality of image data.

4. The image processing apparatus according to claim 1, wherein the control unit controls the output unit to output the maximum luminance information as metadata of the image data.

5. An image processing apparatus capable of processing a plurality of image data having a plurality of luminance ranges, comprising one or more processors and/or circuitry which functions as:
    an output unit that outputs image data and maximum luminance information which is information for indicating a maximum luminance of the image data to an external device;
    a sorting unit that sorts a plurality of image data obtained by image capture;
    a conversion unit that converts pixel values of image data that is obtained by the image capture and is based on a luminance range used in the image data to be output into luminance values that are based on a specific dynamic range among dynamic ranges that an image capturing apparatus that captured the image data is capable of setting; and
    a control unit that controls the output unit to output the image data whose pixel values are converted into the luminance values by the conversion unit and, as the maximum luminance information, a maximum luminance of a plurality of image data sorted into a predetermined group, rather than the maximum luminance of the image data to be output, in a case of outputting, with the output unit, one of the plurality of image data sorted into the predetermined group.

6. The image processing apparatus according to claim 5, wherein the sorting unit sorts the plurality of image data, based on information generated at times of capturing the plurality of image data.

7. The image processing apparatus according to claim 5, wherein the sorting unit, in a case where images that are displayed continuously in a display order of the image data meet a predetermined condition, sorts the image data of the images into the same group.

8. The image processing apparatus according to claim 5, wherein the control unit controls the output unit to output the maximum luminance information as metadata of the image data.

9. An image processing method for processing image data obtained by an image capturing apparatus, comprising:
    acquiring a maximum luminance that the image capturing apparatus is capable of handling;

converting pixel values of image data, obtained by the image capturing apparatus, that is obtained by the image capturing apparatus and is based on a luminance range used in order to obtain the image data into luminance values that are based on a specific dynamic range among dynamic ranges that the image capturing apparatus is capable of setting; and outputting the image data whose pixel values are converted to the luminance values and maximum luminance information which is information for indicating the acquired maximum luminance to an external device.

10. An image processing method capable of processing a plurality of image data having a plurality of luminance ranges, comprising:

sorting a plurality of image data obtained by image capture into a predetermined group;

converting a pixel values of image data that is obtained by the image capture and is based on a luminance range used in the image data to be output into a luminance values that are based on a specific dynamic range among dynamic ranges that an image capturing apparatus that captured the image data to be output is capable of setting; and outputting the image data whose pixel values are converted into the luminance values and maximum luminance information which is information for indicating a maximum luminance of the plurality of image data sorted into a predetermined group to an external device rather than the maximum luminance of the image data to be output, in a case of outputting one of the plurality of image data sorted into the predetermined group.

11. A non-transitory computer-readable storage medium storing a program for causing a computer to function as units of the image processing apparatus for processing image data obtained by an image capturing apparatus, comprising:

an output unit that outputs the image data obtained by the image capturing apparatus and maximum luminance information which is information for indicating a maximum luminance of the image data to an external device;

an acquisition unit that acquires a maximum luminance that the image capturing apparatus is capable of handling;

a conversion unit that converts pixel values of the image data that is obtained by the image capturing apparatus and is based on a luminance range used in order to obtain the image data into luminance values that are based on a specific dynamic range among dynamic ranges that the image capturing apparatus is capable of setting; and a control unit that controls the output unit to output the image data whose pixel values are converted into the luminance values by the conversion unit and the maximum luminance acquired by the acquisition unit as the maximum luminance information.

12. A non-transitory computer-readable storage medium storing a program for causing a computer to function as units of the image processing apparatus capable of processing a plurality of image data having a plurality of luminance ranges, comprising:

an output unit that outputs image data and maximum luminance information which is information for indicating a maximum luminance of the image data to an external device;

a sorting unit that sorts a plurality of image data obtained by image capture;

a conversion unit that converts pixel values of image data that is obtained by the image capture and is based on a luminance range used in the image data to be output into luminance values that are based on a specific dynamic range among dynamic ranges that an image capturing apparatus that captured the image data is capable of setting; and a control unit that controls the output unit to output the image data whose pixel values are converted into the luminance values by the conversion unit and, as the maximum luminance information, a maximum luminance of a plurality of image data sorted into a predetermined group, rather than the maximum luminance of the image data to be output, in a case of outputting, with the output unit, one of the plurality of image data sorted into the predetermined group.

* * * * *